Dec. 28, 1965 L. A. WOOLLEY 3,225,874
UNIDIRECTIONAL SELF STARTING DEVICE FOR SYNCHRONOUS MOTOR
Filed April 26, 1963
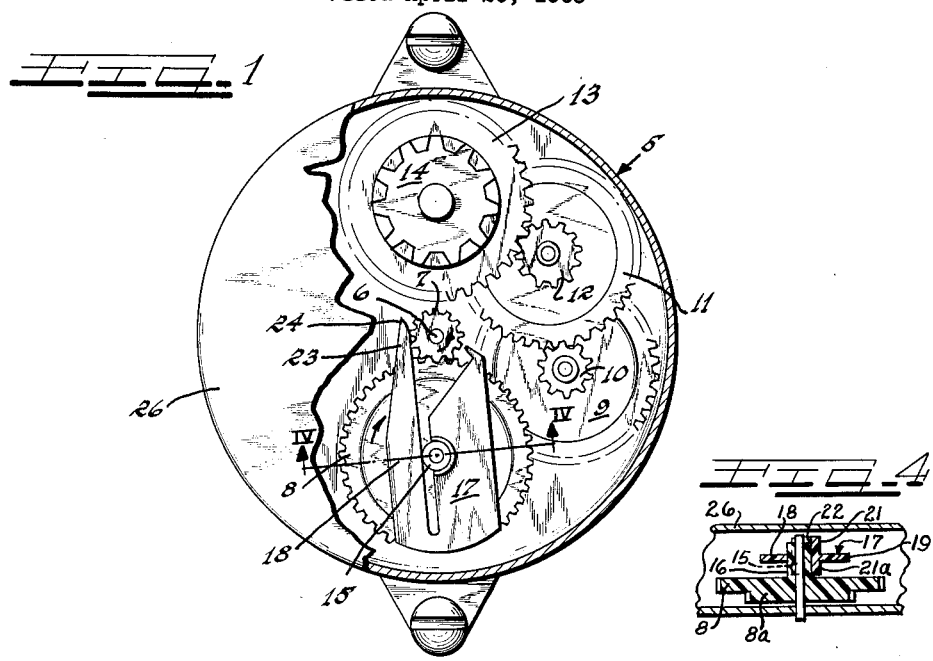
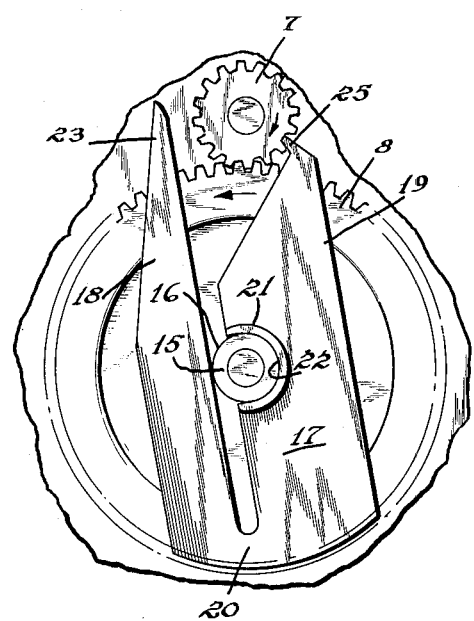
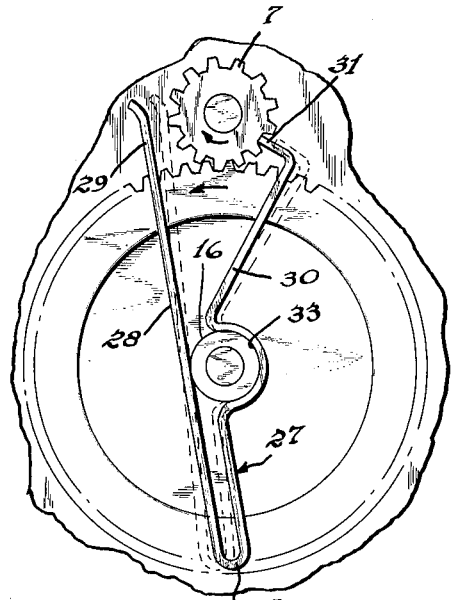
INVENTOR.
Lee A. Woolley
BY
Hill, Sherman, Meroni, Gross & Simpson
ATTORNEYS

United States Patent Office 3,225,874
Patented Dec. 28, 1965

3,225,874
UNIDIRECTIONAL SELF STARTING DEVICE FOR SYNCHRONOUS MOTOR
Lee A. Woolley, Kokomo, Ind., assignor to Kingston Products Corporation, Kokomo, Ind., a corporation of Indiana
Filed Apr. 26, 1963, Ser. No. 276,026
6 Claims. (Cl. 192—4)

This invention relates generally to self-starting electric motors, and more specifically to a structure for insuring that such motor will run in only one direction, which structure is incorporated therein.

It is known that many self-starting motors, such as of the synchronous type, have the inherent ability to start to operate or rotate in either direction when energized, depending upon the portion of the cycle which is present when the motor is first energized. If the motor begins to turn in a desired predetermined direction, all is well, but if the motor initiates rotation in the opposite direction, it then becomes instantly necessary to stop the same and reverse its direction of rotation. Previously, various physical structures have been suggested for insuring that the motor runs in the proper direction by stopping and reversing the same when it starts to turn in the wrong direction. Such structures are collectively known in the trade as "no-back" structures.

Prior "no-back" structures have included an element which cooperates with structure that forms a stationary part of the motor, or which is secured to a stationary part of the motor. This fact has necessitated placing the no-back element immediately adjacent to the motor case or frame or some stationary structure carried thereby. Certain no-back structures have been carried by a rotatable element such as a gear and have had a frictional relationship therewith, the same being provided by means which provide an axial thrust or loading therebetween.

I have provided a no-back structure wherein axial thrust loading elements or means are omitted, wherein the same is neither supported by an additional supporting element provided for such purpose and carried by the case, nor constructed to require coaction with any stationary element.

In the construction of small motors of the type described on a commercial basis, various customers require various gear ratios or output speed, and therefore the manufacturer of the motor must be able to adapt any built-in gear train to meet the various needs and requirements of the commercial market. In some instances, it is practically impossible to fit the requisite gear train into an existing gear case, particularly where a no-back structure is provided which must coact with a stationary element. However, with the structure of this invention, that gear which is provided with the no-back or reversing element may be located in a position not adjacent to any fixed element.

Accordingly, it is an object of the present invention to provide a self-starting motor having an improved mechanism for controlling the direction of rotation of the same.

Another object of the present invention is to provide a novel no-back structure for a self-starting electric motor.

A still further object of the present invention is to provide a no-back structure for a self-starting electric motor which no-back structure may be disposed anywhere, including remotely from any stationary element.

Yet another object of the present invention is to provide a no-back structure wherein axial thrust loading means are omitted.

Yet another object of the present invention is to provide a no-back or reversing member wherein no further arresting structure is needed for such purpose.

Another object of the present invention is to provide a no-back structure for a self-starting motor which is self-supporting and fast-acting.

Still another object of the present invention is to provide a no-back or reversing sturcture for a self-starting motor wherein the no-back structure may physically be reversed to reverse the direction that the motor will continually operate.

Many other advantages, features and additional objects of the present invention will become manifest to those versed in the art upon making reference to the detailed description and to the accompanying sheet of drawings in which preferred structural embodiments incorporating the principles of the present invention are shown by way of illustrative example.

On the drawings:
FIGURE 1 is an elevational view of a self-starting electric motor, with its cover broken away to reveal an internal gear train, the gear train being equipped with a reversing member in accordance with the principles of the present invention;

FIGURE 2 is an enlarged fragmentary view of a portion of FIGURE 1 illustrating the reversing member's position at the moment of motor reversal;

FIGURE 3 is a view corresponding to FIGURE 2, and showing a modified form of reversing member provided in accordance with the principles of the present invention; and FIGURE 4 is a fragmentary cross-sectional view taken along line IV—IV of FIGURE 1.

As shown on the drawings:
The principles of this invention are particularly useful when embodied in an electrical synchronous self-starting motor such as illustrated in FIGURE 1, generally indicated by the numeral 5. The motor 5 includes a rotor (not shown) which is connected to a rotor shaft 6 on which there is supported a gear or rotor pinion 7 driven by and with the rotor. Since the rotor inherently has the ability to initiate rotation in either direction, the rotor pinion 7 may initially rotate in either direction. In FIGURE 1, the arrow on the rotor pinion indicates the direction in which the rotor pinion 7 should turn continually. The rotor pinion 7 meshes with a second gear 8 which has a pinion 8a which drives a gear 9. The gear 9 is corotatable with a pinion 10 that drives a gear 11 which has a corotatable pinion 12 that drives a gear 13 which has a corotatable output pinion or gear 14.

The gear 8 has an axially projecting hub 15 which has a radially outwardly directed peripheral surface 16 which extends axially from the main plane of the gear 8. On the radially outwardly directed peripheral surface 16, there is supported a reversing member 17, seen in larger detail in FIGURE 2.

The reversing member 17 comprises spring-like rigid plastic and has a generally U-shaped configuration including a first leg 18 and a second leg 19 joined integrally together by a bight portion 20. The leg 19 has a boss or hub-like means 21 having a semi-cylindrical inner surface 22 which frictionally engages the radially outwardly directed peripheral surface 16 of the hub 15. Immediately oppositely thereto, the leg 18 has a smooth portion which also engages the radially outwardly directed peripheral surface 16. In its disassembled or free position, the reversing member 17 has an opening or space for receiving the hub 15 which is slightly smaller than the outside diameter of the hub 15 so that when these elements are assembled as shown, there is a frictional spring loading by the legs 18 and 19 against the hub 15. The boss 21 extends in one axial direction from the main plane of the reversing member 17, and a similar boss 21a projects in the opposite axial direction to extend from the plane of the legs 18 and 19. The bosses 21 and 21a thus serve to physically space the legs 18 and 19 out of engagement with adjacent elements 8, 26 of the motor assembly 5.

When the motor operates continually in the direction indicated in FIGURE 1, the frictional drag between the hub 15 and the reversing member 17 causes the reversing member to move or to rock a small angular distance, in the same direction as the arrow indicates on the gear 8 in FIGURE 1, until the free or distal end of the leg 18 engages the teeth of the pinion 7.

The end of the leg 18 which engages the pinion 7 comprises a first portion 23 which has a smooth surface, and which terminates at the distal end 24 at a point which is beyond the point of tangency or engagement between the pinion 7 and the portion 23. Because of the configuration of the distal end 24, rotation of the pinion 7 can at not time effect any blocking engagement therebetween.

In the event that the motor 5 begins to rotate initially in the opposite direction, the pinion 7 will rotate as indicated by the arrow in FIGURE 2 to effect rotation of the gear 8 as indicated by its arrow, thereby effecting rocking of the reversing member 17 in a similar direction. The leg 19 has a second portion 25 which comprises a finger receptive between teeth of the pinion 7 as shown in FIGURE 2, which portion or finger 25 instantaneously blocks rotation of the pinion 7 and effects rebounding in the opposite direction to initiate rotation as shown in FIGURE 1.

The motor 5 includes a cover 26 which is removable, thereby exposing to view the gear train, as shown in FIGURE 1. When so exposed, the reversing member 17 may be manually grasped and slid off or axially removed from the hub 15. Thereafter it may be axially turned end for end and reinserted or reassembled with the portions 23 and 25 reinstalled on opposite sides of the pinion 7 from that in which they are here illustrated. Such a reversal of the position of the reversing member effects a reversal of the direction in which the motor will continually run.

Referring to FIGURE 3, there is shown a further embodiment of reversing member provided in accordance with the principles of this invention. In FIGURE 3, the reversing member is generally indicated at 27 and includes a first leg 28 having a first portion 29, a second leg 30 having a second portion or finger 31, the legs 28 and 30 being joined together in a bight 32. The reversing member 27 preferably comprises a bronze strip, made from flat material and formed in the nature of a spring. When the rotor pinion 7 initiates rotation in the direction of the arrow, the second portion or finger 31 is driven into blocking engagement between the teeth of the pinion 7, as described before. This effects a reversal in the direction of gear rotation, due to rebounding, the rotor pinion 7 thereafter being driven continually in the opposite direction to bring the reversing member 27 into the position shown in broken lines.

The leg 30 likewise includes a central portion formed with a radially inwardly directed surface 33 carried on the peripheral surface 16 and having a sliding frictional fit or drag therewith owing to the coaction of the other leg 28. The inwardly directed surface 33 thus comprises a semi-cylindrical surface which provides a radially inwardly directed force on the hub surface 16.

Although various minor modifications might be surgested by those versed in the art, it should be understood that I wish to embody within the scope of the patent warranted hereon all such embodiments as reasonably and properly come within the scope of my contribution to the art.

I claim as my invention:

1. In a self-starting motor having a rotor capable of starting in either direction, the improvement comprising:
   (a) a pair of interengaged gears, normally driven continually in response to rotation of said motor in a certain direction; and
   (b) a reversing member frictionally carried by one of said gears, and also having a first portion, pivoted about the rotational axis of said one gear and slidably engageable with the other of said gears when said motor runs in said certain direction, and having a second portion blockingly engageable with said other of said gears when said motor begins to run in an opposite direction to effect rotation thereof in said certain direction.

2. In a self-starting motor having a rotor capable of starting in either direction, the improvement comprising:
   (a) a pair of interengaged gears, normally driven continually in response to rotation of said motor in a certain direction; and
   (b) a reversing member frictionally carried by and supported solely by one of said gears, and being rockingly engageable normally solely with said pair of gears, said member also having a first portion pivoted about the rotational axis of said one gear and slidably engageable with the other of said gears when said motor runs in said certain direction, and having a second portion blockingly engageable with said other of said gears when said motor begins to run in an opposite direction to effect rotation thereof in said certain direction.

3. In a self-starting motor having a rotor capable of starting in either direction, the improvement comprising:
   (a) a pair of interengaged gears, normally driven continually in response to rotation of said motor in a certain direction, one of said gears having an axially projecting hub with a radially outwardly directed peripheral surface; and
   (b) a reversing member carried by said one of said gears on said peripheral surface, said reversing member applying a radially inwardly directed force to said peripheral surface for effecting a sliding frictional drag therewith, said member having a first portion slidably engageable with the other of said gears when said motor runs in said certain direction, and having a second portion blockingly engageable with said other of said gears when said motor begins to run in an opposite direction to effect rotation thereof in said certain direction.

4. In a self-starting motor having a rotor capable of starting in either direction, the improvement comprising:
   (a) a pair of interengaged gears, normally driven continually in response to rotation of said motor in a certain direction; and
   (b) a reversing member frictionally carried by one of said gears, and having a first portion slidably engageable with the other of said gears when said motor runs in said certain direction, and having a second portion blockingly engageable with said other of said gears when said motor begins to run in an opposite direction to effect rotation thereof in said certain direction, said reversing member having means enabling it to be slidably removable in an axial direction from said one of said gears and enabling it to be slidably reassemblable therewith in an axially reversed position to effect reversal of said certain direction.

5. In a self-starting motor having a rotor capable of starting in either direction, the improvement comprising:
   (a) a pair of interengaged gears, normally driven continually in response to rotation of said motor in a certain direction, one of said gears having an axially projecting hub with a radially outwardly directed peripheral surface; and
   (b) a reversing member having a pair of spaced legs resiliently joined together in a bight and defining a generally U-shaped configuration, one of said legs having a semi-cylindrical surface, within which said hub is disposed, in sliding frictional engagement with said peripheral surface and supported thereby, the other of said legs engaging said peripheral surface at a point opposite to said semi-cylindrical surface, one of said legs having a first portion slidably engageable with the other of said gears when said motor runs in said certain direction, and the other of said legs having a second portion blockingly engageable with said other of said gears when said motor begins to run in an opposite direction to effect rotation thereof in said certain direction.

6. In a self-starting motor having a rotor capable of starting in either direction, the improvement comprising:
 (a) a pair of interengaged gears, normally driven continually in response to rotation of said motor in a certain direction; and
 (b) a reversing member frictionally carried by one of said gears, and having a first portion slidably engageable with the other of said gears when said motor runs in said certain direction, and having a second portion blockingly engageable with said other of said gears when said motor begins to run in an opposite direction to effect rotation thereof in said certain direction, said reversing member having means projecting axially to space said portions axially from adjacent structure of the motor and from said one gear.

References Cited by the Examiner

UNITED STATES PATENTS

| 1,217,176 | 2/1917 | Hodge | 74—576 |
| 2,722,297 | 11/1955 | Gates | 192—4 |
| 2,788,455 | 4/1957 | Kohlhagen | 192—4 |

FOREIGN PATENTS

| 125,193 | 8/1947 | Australia. |
| 1,255,452 | 1/1961 | France. |

DAVID J. WILLIAMOWSKY, *Primary Examiner.*